US012572684B2

(12) United States Patent (10) Patent No.: US 12,572,684 B2
Boehler (45) Date of Patent: Mar. 10, 2026

(54) SECURE MULTI-PARTY COMPUTATION OF DIFFERENTIALLY PRIVATE HEAVY HITTERS

(71) Applicant: SAP SE, Walldorf (DE)

(72) Inventor: Jonas Boehler, Karlsruhe (DE)

(73) Assignee: SAP SE, Walldorf (DE)

( * ) Notice: Subject to any disclaimer, the term of this patent is extended or adjusted under 35 U.S.C. 154(b) by 765 days.

(21) Appl. No.: 17/357,096

(22) Filed: Jun. 24, 2021

(65) Prior Publication Data

US 2023/0017374 A1 Jan. 19, 2023

(51) Int. Cl.
| | |
|---|---|
| *G06F 21/62* | (2013.01) |
| *G06F 7/08* | (2006.01) |
| *G06F 16/22* | (2019.01) |

(52) U.S. Cl.
CPC ............ *G06F 21/6227* (2013.01); *G06F 7/08* (2013.01); *G06F 16/2282* (2019.01)

(58) Field of Classification Search
CPC ..... G06F 21/6227; G06F 16/2282; G06F 7/08
See application file for complete search history.

(56) References Cited

U.S. PATENT DOCUMENTS

| | | | | |
|---|---|---|---|---|
| 11,170,131 | B1 * | 11/2021 | Rogers | G06F 16/9035 |
| 2018/0114028 | A1 * | 4/2018 | Kafai | H04L 9/3239 |

| | | | | |
|---|---|---|---|---|
| 2018/0336357 | A1 * | 11/2018 | Nissim Kobliner | H04L 9/0643 |
| 2019/0095487 | A1 * | 3/2019 | Le | G06F 16/24534 |
| 2019/0272388 | A1 * | 9/2019 | Tsou | H04L 9/0866 |

OTHER PUBLICATIONS

Anderson et al, "A High-Performance Algorithm for Identifying Frequent Items in Data Streams", May 2017, pp. 1-22, downloaded from https://arxiv.org/pdf/1705.07001 (Year: 2017).*
Chan et al, "Differentially Private Continual Monitoring of Heavy Hitters from Distributed Streams", 2012, pp. 1-30, downloaded from https://link.springer.com/chapter/10.1007/978-3-642-31680-7_8 (Year: 2012).*
Dai et al, "A Multibranch Search Tree-Based Multi-Keyword Ranked Search Scheme over Encrypted Cloud Data", Jan. 2020, pp. 1-15, downloaded from https://www.hindawi.com/journals/scn/2020/7307315/ (Year: 2020).*

(Continued)

*Primary Examiner* — William R Korzuch
*Assistant Examiner* — Forrest L Carey
(74) *Attorney, Agent, or Firm* — Mintz Levin Cohn Ferris Glovsky and Popeo, P.C.

(57) ABSTRACT

According to an aspect, a method may include receiving a candidate value; in response to a received candidate value matching one of the entries in the table, incrementing a corresponding count; in response to the received candidate value not matching one of the entries in the table and the table not exceeding a threshold size, adding an entry to the table; in response to the received candidate value not matching one of the entries in the table and the table exceeding the threshold size, decrementing the counts in the table and deleting entries having a count of zero; adding noise to the corresponding counts in the entries of the table and deleting any noisy corresponding counts less than a threshold value; and outputting at least a portion of the table as the top-k value result set.

15 Claims, 6 Drawing Sheets

(56) References Cited

OTHER PUBLICATIONS

Apple's Differential Privacy Team. Learning with privacy at scale, (available at https://machinelearning.apple.com/research/learning-with-privacy-at-scale) 2017.

Balcer, V. et al., "Separating local & shuffled differential privacy via histograms," arXiv:1911.06879v1, 2019.

Bittau, A. et al., "Prochlo: Strong privacy for analytics in the crowd," In Proceedings of the Symposium on Operating Systems Principles, SOSP, 2017.

Boehler, J. et al., Secure multiparty computation of differentially private median. In 29th USENIX Security Symposium.

Boehler, J. et al., "Secure sublinear time differentially private median computation," In Network and Distributed Systems Security Symposium, NDSS, 2020.

Cheu, A. et al., "Distributed differential privacy via shuffling," In Annual International Conference on the Theory and Applications of Cryptographic Techniques, Eurocrypt, 2019.

Cormode, G. et al., "Methods for finding frequent items in data streams," The VLDB Journal (2010) 19:3-20.

Ding, B. et al., "Collecting telemetry data privately," In Advances in Neural Information Processing Systems, NeurIPS, 2017.

Durfee, D. et al., "Practical differentially private top-k selection with pay-what-you-get composition," In Advances in Neural Information Processing Systems, pp. 3532-3542, 2019.

Dwork, C. et al., "Calibrating noise to sensitivity in private data analysis," In Theory of Cryptography Conference, TCC, 2006.

Dwork, C. "Differential privacy," In International Colloquium on Automata, Languages, and Programming, ICALP, 2006.

Dwork, C. et al., "Our data, ourselves: Privacy via distributed noise generation," In Annual International Conference on the Theory and Applications of Cryptographic Techniques, Eurocrypt, 2006.

Dwork, C. et al., "The algorithmic foundations of differential privacy," Foundations and Trends in Theoretical Computer Science, 2014.

Eigner, F. et al., "Differentially private data aggregation with optimal utility," In Proceedings of the Annual Computer Security Applications Conference, ACSAC, 2014.

Erlingsson, U. et al., "RAPPOR: Randomized aggregatable privacy-preserving ordinal response," In Proceedings of the annual ACM conference on computer and communications security, CCS, 2014.

Fanti, G. et al., "Building a RAPPOR with the unknown: Privacy-preserving learning of associations and data dictionaries," Proceedings on Privacy Enhancing Technologies, 2016.

Goldreich, O. "Foundations of Cryptography: vol. 2, Basic Applications," 2009.

Goryczka, S. et al., "A comprehensive comparison of multiparty secure additions with differential privacy," IEEE transactions on Dependable and Secure Computing, 2017.

Guevara, M., Google Developers Blog. "Enabling developers and organizations to use differential privacy," 2019.

Hsu, J. et al., "Distributed private heavy hitters," In International Colloquium on Automata, Languages, and Programming, ICALP, 2012.

Kasiviswanathan, S.P. et al., What can we learn privately? SIAM Journal on Computing, 2011.

McGregor, A. et al., "The limits of two-party differential privacy," In Annual IEEE Symposium on Foundations of Computer Science, FOCS, 2010.

McSherry, F. et al., "Mechanism design via differential privacy," In Annual IEEE Symposium on Foundations of Computer Science, FOCS, 2007.

Neel, S. et al., "Differentially private objective perturbation: Beyond smoothness and convexity," arXiv:1909.01783, 2019.

Pettai, M. et al., "Combining differential privacy and secure multiparty computation," In Proceedings of the Annual Computer Security Applications Conference, ACSAC, 2015.

Rastogi, V. et al., "Differentially private aggregation of distributed time-series with transformation and encryption," In Proceedings of the annual ACM SIGMOD International Conference on Management of data, SIGMOD, 2010.

Rogers, R. "A differentially private data analytics {API} at scale," Conference Presentation, In USENIX Conference on Privacy Engineering Practice and Respect, PEPR, 2020.

Rogers, R. et al., "Linkedin's audience engagements api: A privacy preserving data analytics system at scale," arXiv:2022.05839, 2021.

Takabi, H. et al., "Differentially private distributed data analysis," In IEEE International Conference on Collaboration and Internet Computing, CIC, 2016.

Wang, T. et al., "Locally differentially private heavy hitter identification," IEEE transactions on Dependable and Secure Computing, arXiv:1708.06674, 2017.

Wilson, R.J. et al., "Differentially private SQL with bounded user contribution," In International Symposium on Privacy Enhancing Technologies Symposium, PETS, 2020.

WWDC 2016. "Engineering privacy for your users," Transcript. 2016 (Available at https://wwdctogether.com/wwdc2016/709).

Bhaskar, R. et al., "Discovering Frequent Patterns in Sensitive Data," Proceedings of the 19th International Conference on Information & Knowledge Management and Co-Located Workshops, (CIKM '10), Jul. 25, 2010, pp. 503-512.

Bhattacharyya, A. et al., "An Optimal Algorithm for $\ell_1$-Heavy Hitters in Insertion Streams and Related Problems," ACM Transactions on Algorithms, vol. 15, No. 1, Oct. 22, 2018, pp. 1-27.

Extended European Search Report issued in European Application No. 21211207.2-1218, mailed May 3, 2022, 16 pages.

* cited by examiner (a) Central Model (b) Local Model (c) Shuffle Model with permutation $\pi$ Top-k output

300

500

SECURE MULTI-PARTY COMPUTATION OF DIFFERENTIALLY PRIVATE HEAVY HITTERS

BACKGROUND

Services for performing analytics (e.g., statistics, aggregate queries, or the like) on sensitive data may involve sharing data with a third party. In some instances, it may not be desirable or feasible for one or more parties sharing data to share plaintext data. For example, the data may be sensitive data that is not permitted to be shared. In some instances, the parties sharing the data may be mutually distrusting parties. In other instances, use of a trusted third party may not be feasible as the trusted third party may become compromised.

SUMMARY

Methods, systems, and articles of manufacture, including computer program products, are provided for secure multi-party computations.

According to an aspect, a system includes at least one data processor and at least one memory storing instructions which, when executed by the at least one data processor, result in operations comprising: generating, for a top-k value determination across a plurality of clients, a table including entries to map candidate values to corresponding counts; receiving, from each of the plurality of clients, a candidate value; in response to a received candidate value matching one of the entries in the table, incrementing, for the matching candidate value, a corresponding count; in response to the received candidate value not matching one of the entries in the table and the table not exceeding a threshold size, adding an entry to the table by adding the received candidate value with a count value of 1; in response to the received candidate value not matching one of the entries in the table and the table exceeding the threshold size, decrementing all of the counts in the table by 1 and deleting from the table any entries having a count of zero; adding noise to the corresponding counts in the entries of the table; in response to a noisy corresponding count being less than a threshold value, deleting the corresponding entry in the table for the noisy corresponding count; and outputting at least a portion of the table as the top-k value result set.

In some variations, one or more of the features disclosed herein including the following features can optionally be included in any feasible combination. The table may be sorted based on the noisy corresponding count before the outputting. The system may comprise or be comprised in a trusted server. The top-k value result set is determined based on a multi-party computation using a domain of data across the plurality of clients, wherein the top-k value result set is determined over the domain of data. The system may utilize, to perform the multi-party computation, at least one compute node at a cloud provider or at least one compute node at one or more of the plurality of clients. The receiving, from each of the plurality of clients, the candidate value may include, receiving the candidate value in a secured message, the secured message further including a partial noise value. The adding noise to the corresponding counts in the entries of the table further may include adding the noise based on the partial noise value from each of the plurality of clients. The outputting at least a portion of the table as the top-k value result set may further include outputting the at least a portion of the table in a secured message. The top-k value result set may be output in accordance with differential privacy.

It is to be understood that both the foregoing general description and the following detailed description are exemplary and explanatory only and are not restrictive. Further features and/or variations may be provided in addition to those set forth herein. For example, the implementations described herein may be directed to various combinations and subcombinations of the disclosed features and/or combinations and subcombinations of several further features disclosed below in the detailed description.

DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

Figure 1A:
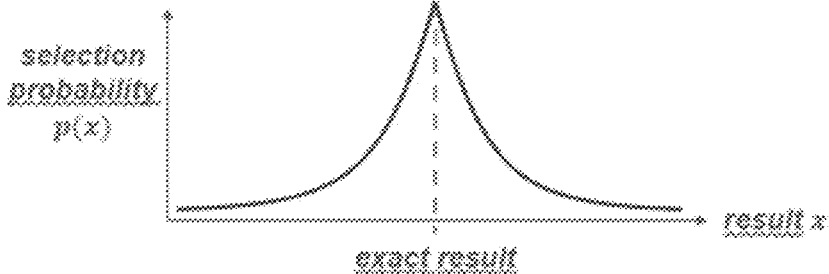
FIG. 1A shows conceptually a mechanism for adding noise to enhance differential privacy, in accordance with some example embodiments.

Like labels are used to refer to same or similar items in the drawings.

DETAILED DESCRIPTION

Data collection is a primary function of many entities around the globe. For example, some entities offer a free service, such as Internet searching or a social network, and then monetize data collection of end-user data from those free services. However, unrestricted, general data collection that allows uniquely identifying the identity of an end-user may cause ethical and/or legal concerns under the data protection regulations of certain jurisdictions, such as General Data Protection Regulations (GDPR). Specialized, privacy-preserving data collection may alleviate some of these data collection-related privacy concerns. For this reason, differential privacy (DP) may be used to provide a strong privacy guarantee. Moreover, secure, multi-party computation (MPC) may be used in combination with differential privacy. The additional use of secure multi-party computation may improve accuracy, without reducing privacy. Secure multi-party computation is a cryptographic tool that allows multiple parties to evaluate a function on data distributed among the parties but only the function's result is revealed or shared among the parties (in other words, the input data is not shared among the parties). However, secure computation of a differential privacy mechanism may be considered generally less efficient, with potentially high communication and computation overhead.

Disclosed herein is a solution to the problem of distributed private learning of the top-k values, such as the k most common values (which is also referred to as the top k "heavy hitters"). The term "k" refers to how many of the top values, such as top 1 (k=1), top 2 values (k=2), and so forth, are in the result set. For example, multiple, distributed users may determine, such as compute, the top-k values with high accuracy, a strong privacy guarantee, and without resorting to trusted third parties for holding and sharing a user's private data for the calculation. To that end, in some embodiments, there is provided a secure multi-party computation (MPC) of differentially private (DP) top-k values.

In some embodiments, there is provided a first protocol HH1 and a second protocol HH2. These protocols securely compute in a differentially private way the top-k values, without disclosing a party's private information during the computation while providing differential privacy protection for the computation output. Moreover, the HH1 and HH2 protocol may be considered highly accurate even for small data sets (of, for example, few users), which is a challenging regime for differential privacy and/or may be considered to have a practical run time (e.g., efficient, optimized compute implementation).

In the following, $\mathcal{F}_{HH1}$ refers to a so-called "ideal" functionality as run by a trusted third party, for example, while the HH1 protocol example may thus refer to an example MPC implementation of $F_{HH1}$ which replaces the trusted third party with cryptographic protocols. HH1 may combine heavy hitter detection (e.g., top-k value(s)) with a differently private (DP) bounded count release (e.g., releasing values whose noisy count exceeds a threshold). More-over, efficient, secure computation implementation examples for $\mathcal{F}_{HH1}$ is also provided in the form of the HH1 algorithm (see, e.g., Tables 5 and 7 below). The function for the second protocol $\mathcal{F}_{HH2}$ combines distributed heavy hitter detection with a central differential privacy heavy hitter detection. Moreover, efficient, secure computation implementations for $\mathcal{F}_{HH2}$ is also provided in the form of the HH2 algorithm (see, e.g., Tables 8 and 9 below).

The use of a differentially privacy top-k values discovery can be used in a variety of environments. For example, user behavior data mining may be performed across multiple parties, such as users, in a differentially private manner. The user behavior mining may include determining, for example, frequently typed words on a client device (which can be used to improve auto-complete suggestions), detect user selections or settings of a given application, and the like. To illustrate further, differentially private telemetry data collection may be deployed to client devices to allow answering queries such as what are the top-k items among users at the client devices. End users can execute the secure, privacy-preserving analytics over their combined data, without revealing any of their own data to anybody else (due to the disclosed efficient secure computation). Moreover, the data need not be shared with a trusted third party to obtain a result to the query for the top-k values. To illustrate further, queries such as what are the k-top most commonly accessed applications or the k-top most searched for products (or, e.g., viewed, bought, returned product) can be answered using the secure MPC DP protocols HH1 and HH2 disclosed herein without violating the privacy of any individual user's private data. The privacy-preserving protocols for the k-top values disclosed herein may also be used in computations to gather information not only from end user's at a single entity, such as a company's end-users, but across different entities (e.g., different companies which do not normally share private data) and their corresponding end users, while providing strong privacy and security guarantees between the entities (and/or the end users). For example, information may be computed from different companies (while not sharing the private information of any of the companies) to provide holistic insights for an industry sector, for example.

Before providing additional details regarding the HH1 and HH2 protocols (and the corresponding $\mathcal{F}_{HH1}$ and $\mathcal{F}_{HH2}$ implementations) the following provides a description regarding differential privacy and secure multiparty computations.

In some of the examples disclosed herein, a party or a user may refer to a client machine (or device), such as a computer, Internet of Things (IoT) device, and/or other processor-based machine. Given for example, a set of quantity of n parties, this can be represented as follows:

$$\mathcal{P}=\{P_1, \ldots, P_n\},$$

where each party $P_i$ holds at least at least a single data value $d_i$, where i varies from 1 to n, and D denotes the combined data set of the parties, $\mathcal{P}$. The combined data set may be modelled as D={wherein $d_1, \ldots, d_n$}, $d_1, d_2, \ldots d_n$ are data values (or more simply "data") of the data domain U (e.g., a data universe U representing a set of potential data values, such as a set of all integers, a set of integers, and a like).

Secure multi-party computation (which is also referred to as multi-party computation, MPC) may enable the set of parties, $\mathcal{P}=\{P_1, \ldots, P_n\}$ to jointly compute a function, such as a median, mode, top-k, or other type of function or operation, without each party sharing their data set with the other parties. In MPC for example, each party may take part in the MPC by providing, or exchanging, a secure input message (e.g., a secret share) with the other parties, such that the parties operate on those messages to jointly compute the function. The final output reveals a final encrypted output, which can be decrypted (e.g., using secret shares) by each of the parties to reconstruct or reveal the result, without each of the parties revealing their private data. Secret sharing refers to distributing a secret among a group of parties, each of which is allocated a share of the secret such that the secret can be reconstructed only when a sufficient number of shares are combined together. To illustrate secret sharing, Shamir's Secret Sharing (SSS) can be used to secure a secret in a distributed way (e.g., the secret is split into multiple parts, or shares), which are used to reconstruct the original secret.

In the case of the HH1 and HH2 protocols (and the corresponding $\mathcal{F}_{HH1}$ and $\mathcal{F}_{HH2}$), the function being computed is the top-k values among the data sets of the parties. Given for example each party $P_i$ holds sensitive input data $d_i$, the set of parties may jointly compute the top-k function $y_i, \ldots, y_k = f(d_1, \ldots, d_n)$, while maintaining the privacy of the inputs $d_1, \ldots, d_n$. The output of the secure multi-party computation must be correct and secret; in other words, the correct value of the k-top output values $y_1, \ldots, y_k$ must be computed and the secrecy of the input data $d_1, \ldots, d_n$ is preserved among the parties, so only the output is revealed to the parties.

Secure multi-party computation may be implemented using different trust assumption models. In a semi-honest model (or passive), the parties (also referred to as adversaries) do not deviate from the protocol but gather everything created during the run of the protocol. However, in the malicious model (or active), the parties can deviate from the protocol (e.g., alter messages).

Differential privacy (DP) provides, as noted, strong privacy guarantees by restricting what can be provided as an output. When a single data value of the input data set changes for example, the effect on the output may be restricted or bounded, so that privacy is maintained. If an algorithm is differentially private, an observer seeing the algorithm's output would not be able to discern an input data value used to compute the output. Some form of randomization is an essential aspect for differential privacy to hide and maintain the privacy of a party's input data. In a mathematical or formal sense, differential privacy may be defined as shown in Table 1 below, although less formal definitions of differential privacy may satisfy the input data privacy required of differential privacy. Although the definition provided at Table 1 holds against an unbounded adversary; in the case of cryptography however, the definition may also hold for a computationally bounded adversary as well. At Table 1, (ε, 0)-DP may be referred to as pure DP, and approximate DP allows an additional, additive privacy loss d>0. Typically, d is negligible in the size of the data. While pure DP mechanisms are presented, the protocols apply them in combination with d-based thresholds and thus may satisfy approximate DP.

TABLE 1

Definition 1 (Differential Privacy). A mechanism 𝓜 satisfies
(ε,δ)-differential privacy, where ε,δ ≥ 0, if for all neighboring
data sets D ≅ D', i.e., data sets differing in a single entry, and
all sets S ⊆ Range(𝓜)
    Pr[ 𝓜 (D) ∈ S] ≤ exp(ε) · Pr 𝓜 (D') ∈ S = δ,
where Range(𝓜) denotes the set of all possible outputs of
mechanism 𝓜 .

Randomization may be provided by adding noise, which is an aspect used to achieve differential privacy, such that an individual's data may be hidden or obfuscated. For example, noise may be added to a function's output to provide a degree of differential privacy. A way of adding noise may be in the form of a Laplace mechanism. In the case of the Laplacian mechanism, the noise added is drawn from a Laplace distribution. In a mathematical or formal sense, the Laplace mechanism may be defines as shown in Table 2 below.

TABLE 2

Definition 2 (Laplace Mechanism $M_L$). The Laplace mechanism $M_L$ for function f: $U^n$
→ ℝ with sensitivity Δ f = $\max_{\forall D \equiv D'}$| f (D) − f (D')|, releases
    f(D) + Laplace(Δf/ε),
where Laplace(b) denotes a random variable from the Laplace distribution.

An alternative to additive noise is the use of probabilistic output selection via the Exponential mechanism. In the case of the Exponential mechanism, the Exponential mechanism (EM) computes selection probabilities according to exponentially weighted utility scores. The Exponential mechanism expands the application of differential privacy to functions with non-numerical output, or when the output is not robust to additive noise, such as in the case of a median function. The Exponential mechanism is exponentially more likely to select "good" results where "good" is quantified via a utility function u(D, r) which takes as input a database D∈ $U^n$, and a potential output r E R from a fixed set of arbitrary outputs R. Informally, the Exponential mechanisms outputs elements with probability proportional to:
    exp $$\left(\frac{\varepsilon u(D, r)}{2\Delta u}\right),$$

and higher utility means the output is more desirable and its selection probability is increased accordingly.

FIG. 1A depicts an example of the selection probabilities computed by the Exponential mechanism, in accordance with some example embodiments. In a mathematical or formal sense, the Exponential mechanism can be defined as shown in Table 3 below, although less formal definitions of the exponential function may be use as well. In the examples described herein, the Exponential mechanism (EM) is denoted as $EM_u^\varepsilon(D)$ (although in some of the examples described herein, the u and/or ε notations may not be included in the does not include the $EM_u^\varepsilon(D)$ shown below in Table 3. At Table 3, "𝓡" refers to the set of potential output values.

TABLE 3

Definition 2 (Exponential mechanism). For any utility function u:
($U^n$ × 𝓡) → ℝ and a privacy parameter ε, the Exponential mechanism $EM_u^\varepsilon(D)$ outputs r ∈ 𝓡 with probability proportional to $\exp\left(\frac{\varepsilon u(D,r)}{2\Delta u}\right)$, where $$\Delta u = \max_{\forall r \in \mathcal{R}, D \approx D'} |u(D, r) - u(D', r)|$$

is the sensitivity of the utility function. That is, $$Pr[EM_u^\varepsilon(D) = r] = \frac{\exp\left(\dfrac{\varepsilon u(D, r)}{2\Delta u}\right)}{\displaystyle\sum_{r' \in \mathcal{R}} \exp\left(\dfrac{\varepsilon u(D, r')}{2\Delta u}\right)} \;.. \tag{1}$$

The argmax over utility scores with additive noise from the Gumbel distribution may be equivalent to Exponential mechanism. The Gumbel mechanism, which has the same or similar output distribution as the Exponential mechanism, adds Gumbel-distributed noise to the utility scores and selects the output with the highest noisy score (arg max of noisy utility score). In a formal or mathematical sense, the Gumbel mechanism MG may be defined as shown in Table 4 below.

TABLE 4

Definition 3 (Gumbel mechanism $M_G$). The Gumbel mechanism MG, for utility function u: ($U^n$ × R) → R with sensitivity $\Delta u = \max_{\forall r \in \mathcal{R}, D \approx D'} |u(D, r) -$ $u(D', r)|$, outputs r ∈ 𝓡 via $\arg\max_{r \in \mathcal{R}} \{u(D, r) + \text{Gumbel}(2\Delta u / \varepsilon)\}$, where Gumbel(b) denotes a random variable from the Gumbel distribution.

Noise, such as Laplace noise, exponential noise, and/or Gumbel noise may be used for the differential privacy mechanisms. These types of noise may be generated by multiple parties. For example, each party may provide a partial noise that in combination with noise from other parties becomes the required noise for differential privacy. The Laplace (b) may be expressed as the sum of n partial noise values as follows:

$$\sum_{j=1}^{n} \left( Y_j^1 - Y_j^2 \right)$$

where $Y_j{}^1, Y_i{}^2$ are samples from gamma distribution Gamma $$\left( \frac{1}{n}, b \right)$$

and gamma distribution with shape k=1/n and scale b has density as follow:

$$\text{Gamma}(x; k, b) = \frac{1}{\Gamma(k)b^k} x^{k-1} \exp\left( -\frac{x}{b} \right).$$

The Gumbel (b) may be expressed as follows:

$$b \cdot \lim_{n \to \infty} \left\{ \sum_{j=1}^{n} \frac{Y_j}{j} - \log(n) \right\},$$

where $Y_j$ is sampled from exponential distribution Expon(1), and exponential distribution with scale b has density as follows:

$$Expon(x; b) = \frac{1}{b} \exp\left( -\frac{x}{b} \right)$$

for x>0, and 0 elsewhere.

Figure 1B:
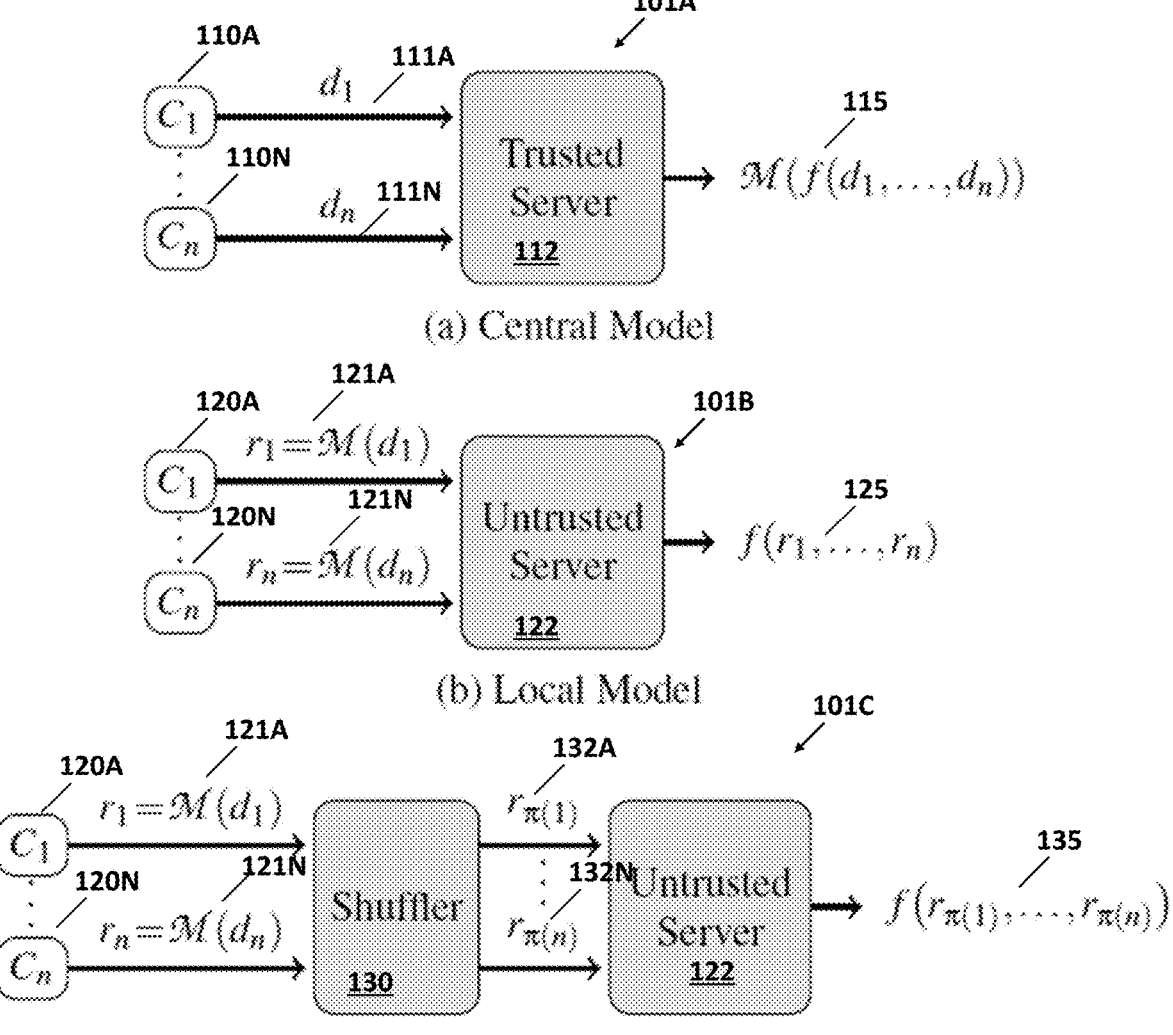
FIG. 1B depicts examples of the models in which differential privacy algorithms may be implemented, in accordance with some example embodiments.

FIG. 1B depicts examples of differential privacy implementation models M, such as a central model 101A, a local model 101B, and a shuffle model 101C. In the central model 101A, each of the parties 110A and 110N (depicted as client devices "C₁" . . . "C_N") send their unprotected data to a trusted, central server 112, which runs the differential privacy algorithm $\mathcal{M}$ on the clear data. The central model may provide the highest accuracy as the randomization inherent to differential privacy algorithms is only applied once at the trusted central server 112. In the example of FIG. 1B, the differential privacy algorithm $\mathcal{M}$ combines a function (e.g., to compute a top-k value(s) or other function or operator to be calculated via the MPC) with a randomization process. In this example, $\mathcal{M}$ is a differential privacy mechanism that computes utility scores for the function (which is being computed via MPC) and probabilistically selects outputs based on the computed utility scores, where higher scores can translate to higher selection probability.

In the local model 101B, each of the parties 120A and 120N (depicted as client devices "C₁" . . . "C_N") locally apply the differential privacy algorithm $\mathcal{M}$ and then send anonymized values 121A-121B to an untrusted server 122 for aggregation. In the case of the local model 101B, the accuracy of the output 125 may be limited as the randomization is applied multiple times. Hence, the local model 101B may require a relatively large number of users to achieve accuracy comparable to the central model.

In the case of the intermediate shuffle model 101C, a shuffler 130, which is a trusted party added between the parties 120A-N and the server 122. The shuffler does not collude with any of the parties 120A-N. The shuffler permutes and forwards the randomized client values 132A-B.

The permutation breaks the mapping between a client and her value, which reduces randomization requirements. The accuracy of the shuffle model 101C may be between the accuracy of the local model 101A and the central model 101B; but in general, the shuffle model 101C is strictly weaker than the central model 101B. The centralized MPC model 101A may generally incur a high computation burden and communication overhead (which reduces efficiency and scalability to larger quantities of clients/parties). The centralized MPC model 101A may provide some of the benefits over the other models, such as higher accuracy and stronger privacy (e.g., no disclosure of values to a third party).

The following provides a description of the first protocol $F_{HH1}$ including an example MPC implementation HH1 for the first protocol using MPC, and there is provided a description of the second protocol $F_{HH2}$ including an example implementation HH2 for $F_{HH2}$. Although some of the examples refer to the use of a trusted third party server, the examples described herein may also be implemented with secure MPC.

FIGS. 2A-2F depict an example of the first protocol $\mathcal{F}_{HH1}$ to determine the top-k or heavy hitter values, in accordance with some example embodiments. To simplify the explanation, the example is initially explained with respect to $F_{HH1}$ with the use of a trusted party.

In the example of FIGS. 2A-2F, the set of parties 202A-E includes party P1, P2, P3, P4, and P5. The set of parties represent the set of parties over which the top-k is determined. In this example, the party P1 holds the value 4, party P2 holds the value 4, party P3 holds the value 5, party P4 holds the value 3, and the party P5 holds the value 5. The process to determine the among the parties may be triggered by a request from any of the parties, P1-P5 or another party (e.g., another entity may request the top-k among the parties as well).

The trusted server, which is represented by a compute server 210, creates a table 266A with entries that map the data values (labeled "values") in the domain of data values to a corresponding count. For example, the compute server 210 creates table 266A, such that each data entry includes a data value mapped to a count (see, e.g., Table 5 below at 1). In this example, the table 266A includes a single value 4 mapped to count 1 as only the single value 4 is received, at 220A, from the first party P1 at the client device 202A. In other words, d is an element of the table T (d∈T), so the count value is incremented to 1 (e.g., T[d]=1).

Figures 2A, 2B, 2C, 2D, 2E:
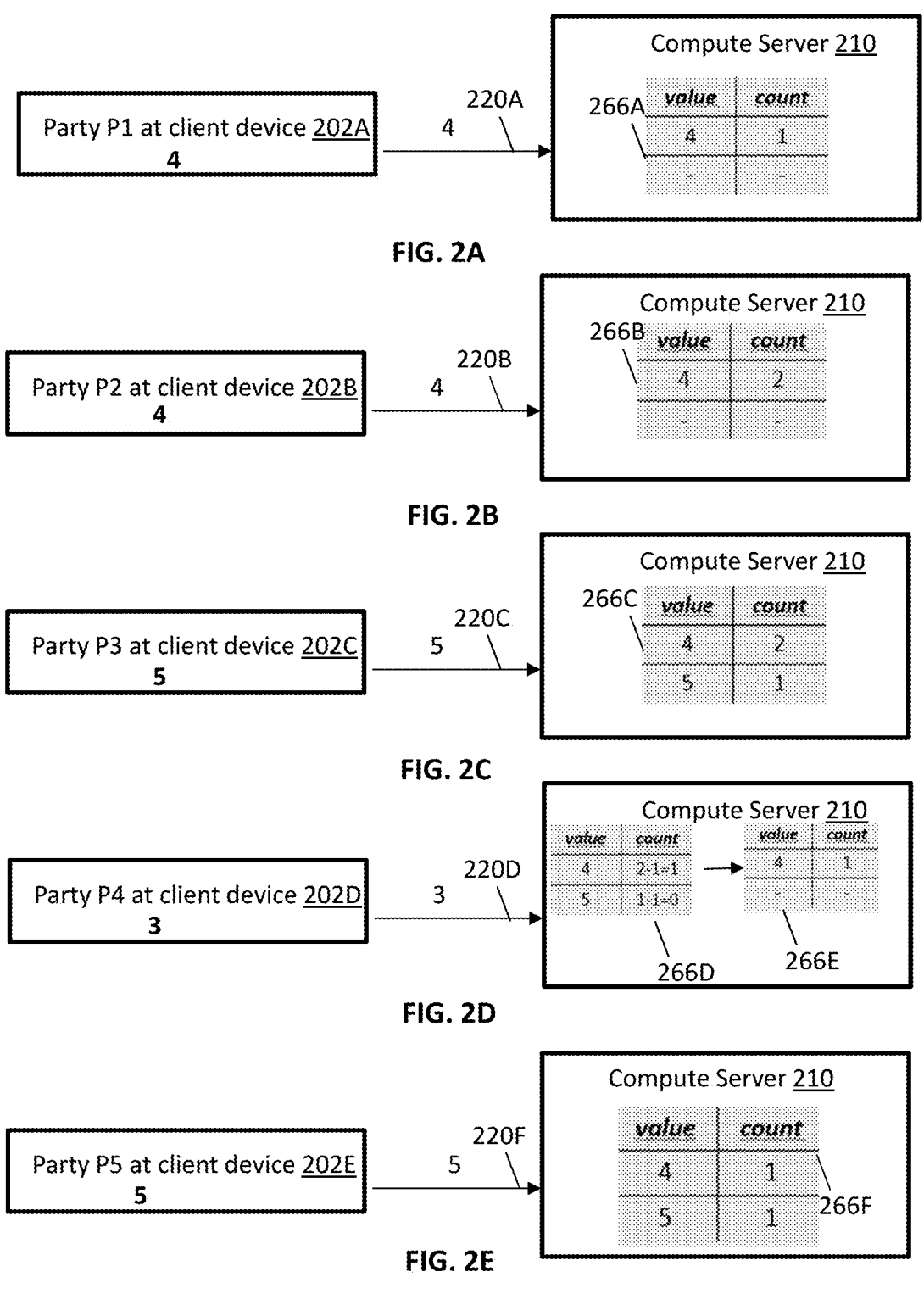
FIGS. 2A-F depict an example of a process for a first algorithm HH1 that determines the top-k or heavy hitter values, in accordance with some example embodiments.

At FIG. 2B, the compute server 210 receives, at 220B, a second datum such as data value 4 from the second party P2 at client device 202B. As the value 4 is an element of the table T 266B (e.g., d∈T), the counter value is incremented to 2 (e.g., T[d]=2) as shown at table 266B (see, e.g., Table 5 below at 2a).

At FIG. 2C, the compute server 210 receives, at 220C, a third datum 5 from the third party P3 at client device 202C. As the value 5 is not an element of table T 266C and the table T is not full, an entry is added to the table 266C to include the value 5 and the corresponding count incrementing the zero count to a count of 1 (see, e.g., Table 5 below at 2b: if |T|<t, then add d to T, and set T [d] to 1).

At FIG. 2D, the compute server 210 receives, at 220D, a fourth datum 3 from the fourth party P4 at client device 202D. As the value "3" is not an element of table T 266D and the table T is full (in this example, the table size is 2), all the counters are decremented by 1 266D and then all values having a count of zero are removed, so only the value 4 remains with a count of 1 at table 266E (see, e.g., else, decrement all counters T[i], and remove i from T if T[i]=0; see, e.g., Table 5 below at 2c).

At FIG. 2E, the compute server 210 receives, at 220E, a fifth datum 5 from the fifth party P5 at client device 202E. As the value 5 is not an element of table T 266F and the table T is not full, the value 5 is added and the counter is incremented by 1 (see, e.g., If d∈T, then increment counter T[d]=1; see, e.g., Table 5 below at 2b).

At FIGS. 2A-2E, the compute server 210 generates a fixed size table T having at most t entries (size t), which in the example is a size of 2 to map the values from the parties to the counts. As each of the values is received from each party, the compute server processes the values such that if the value matches an entry in the table the count is increased. But if the value does not match an entry in the table and the table is not full, the received value is added as an entry in the table T and the corresponding counter for that value is incremented by 1. But if the value does not match an entry in the table and table T is full, the compute server subtracts 1 from all counters and then removes all values having a count equal to 0. After the values from each of the parties 202A-202E are processed, the compute server 210 may output the top-k values based on the contents of the table T, such as table 266F. In this example, the top-k values may correspond to the first two entries of table 266F, such as the values 4 and 5.

In some embodiments, noise may be added to the counts, and values whose noisy count is below a threshold is removed. For example, the compute server may add noise to the counts in the table, such as table 266F, before providing an output of the top-k. Moreover, noisy counts below a threshold may be removed. The thresholding may help ensure that values (which are provided by a plurality of parties rather than a single party) help to protect privacy as we require enough participants to allow small changes (single value added/removed) to not alter the outcome with high probability (whereas multiple changes can alter the outcome). In other words, individual contributions are protected and not necessarily released but aggregated contributions of many individuals (with additive noise) are released as an output (with high probability).

Figure 2F:
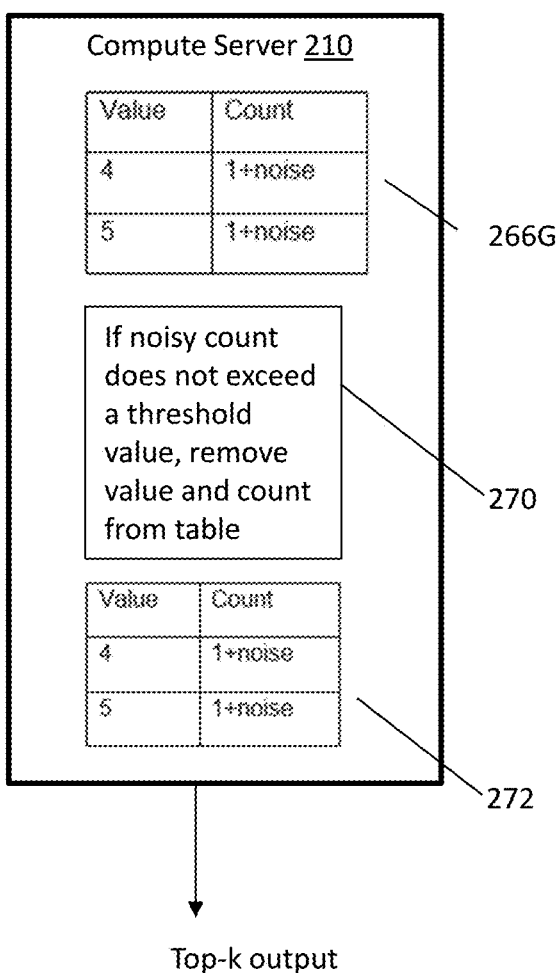

In the case of additive noise and a trusted third party in accordance with some example embodiments, $F_{HH1}$ would value, the noisy count is removed from the table at 270. In the example of FIG. 2F both counts exceeded the threshold, so both noisy counts and values remain in the table 270. After the noisy thresholding at 270, the trusted server, which in this example is compute server 210, releases the table 272 as an output to provide the top-k values, which in this example is top-2.

Table 5 provides an example implementation of the $F_{HH1}$ for the top-k values using additive noise and a trusted third party, in accordance with some example embodiments. In the example of Table 5, at line 3(a), noise is added to the counts as noted above. At line 3(b) a value i is removed from the table T unless it exceeds a threshold value, τ. And, at line 4 the remaining values in the table are sorted by their noisy counts and then released as an output. Referring to FIG. 2F, the top-k may be sorted based on noisy counts before being released (e.g., the most prevalent heavy hitter would appear first in the sorted output).

| Value | Count |
|-------|-------|
| 4 | 1 + noise |
| 5 | 1 + noise |

TABLE 5

1. Define map T of maximum size t to associate a value with a count.
2. For each user reported value d ∈ D:
   (a)  If d ∈ T, then increment counter T[d].
   (b)  Else if | T | < t, then add d to T, and set T [d] to 1.
   (c)  Else, decrement all counters T[i], and remove i from T if
      T[i] = 0.
3. For each value i ∈ T:
   (a)  Add noise Laplace(Δ/ε) to count T [i].
   (b)  Remove i from T unless
      T[i] ≥ $\tau_{HH1}$,
   where $\tau_{HH1}$ = 1 − Δlog(2−2(1−δ)$^{1/Δ}$)/ε.
4. Output values in T sorted by their noisy count.

At Table 5 (as well as Table 7 below), the symbol Δ denotes the maximum number of counts an individual party can influence, so for example Δ=1 (when we query countries of origin, for example) or Δ≥1 (when there are queries of current and former employers, for example).

TABLE 6

| MPC protocol | Output/Functionality |
|--------------|----------------------|
| EQ (⟨a⟩,⟨b⟩) | ⟨1⟩ if a = b, else⟨0⟩ |
| LE (⟨a⟩,⟨b⟩) | ⟨1⟩ if a ≤ b, else⟨0⟩ |
| ADD (⟨a⟩,⟨b⟩) | ⟨a + b⟩ |
| AND (⟨a⟩,⟨b⟩) | ⟨a · b⟩ |
| NOT (⟨a⟩) | ⟨1 − a⟩ |
| CondSwap (⟨a⟩,⟨b⟩,⟨c⟩) | ⟨a⟩ if bit c = 1, else⟨b⟩ |
| Rec (⟨a⟩) | Reconstruct secret a | further include, as shown at FIG. 2F, the compute server 210 adding noise, such as Laplacian distributed noise and the like, to the count values as depicted the table 266G. Table 266G corresponds to the table 266F after the addition of noise to the count values (which is represented by N(1+ noise), where 1 is the count, noise represents the added noise, and N is the function used to add the noise). If a noisy count does not exceed a threshold value, the value and count at the table 266F are removed. At 270, the trusted server checks to see whether a noisy count exceeds a threshold. For example, if the noisy count does not exceed a threshold In the case of an implementation where a trusted third party server is not used but instead MPC is used, the $F_{HH1}$ algorithm described above may be implemented as the HHI MPC algorithm depicted at Table 7 below. In other words, the MPC HH1 algorithm is similar to $\mathcal{F}_{HH1}$ but HH1 uses MPC rather than a trusted server and the parties provide encrypted inputs (e.g., using secret shares or other cryptographic technology) including the value and a partial noise value, to enable the joint computation of the top-k values.

For example, the parties 202A-E may perform the joint computation of the top-k using MPC (also referred to as secure MPC) among the parties by exchanging messages securely (e.g., secret sharing), where the secured messages represent the input to the MPC joint computation of the top-k. For example, the secure message from party 202A may include the value (e.g., "4" in the example of 220A) and a partial noise value. The parties operate on the secured input messages to yield a secured final output, such as the top-k. The secured final output is encrypted (secret shares), and can be decrypted by each of the parties to reconstruct or reveal the result, such as the top-k values. Although the parties may jointly compute the top-k function, the parties may, however, outsource this MPC processing to a compute node (e.g., a plurality of cloud-service providers). The outsourcing allows a distribution of trust (where there is no single totally trusted party but multiple semi-honest parties only if a majority of them where to collaborate or where attacked/ hacked, the secrets could be reconstructed). For this, the the MPC, the operations performed may include mainly add operations, although Table 6 lists an example of some of the operations used.

At Table 7, the MPC operations (or subprotocols) are listed in Table 6. The outputs of these subprotocols are encrypted (e.g., secret share), except for Rec(•), which reconstructs the output using the secret share ("decrypts"). Protected values are surrounded with angled brackets, such as $\langle • \rangle$, which may be considered a form of encryption (via, e.g., secret share). The upper case letters in Table 7 denote arrays, where A[j] denotes the jth element in array A, for example. The array V holds the values, the array C holds the count, the array N holds the noise being added. The Boolean values (in the form of a bit) are indicated with $b_{state}$ (e.g., $b_{match}=1$ indicates a match).

TABLE 7

| | |
|---|---|
| Input: User data D, partial noises $\rho_p$ per party $\rho \in \mathcal{P}$, output size k, map size t, and DP threshold $\tau_{HH1}$. | |
| Output: DP top-k. | |
| 1: | Initialize arrays V, C, N of size t with $\perp$, 0, 0 respectively. |
| 2: | for user datum d $\in$ D do //Update counts C for values V |
| 3: | Initialize $\langle b_{found} \rangle \leftarrow \langle 0 \rangle$ and $\langle i_{empty} \rangle \leftarrow \langle -1 \rangle$ |
| 4: | for j $\leftarrow$ 1 to t do |
| 5: | $\langle b_{match} \rangle \leftarrow$ EQ($\langle d \rangle$, $\langle V[j] \rangle$) |
| 6: | $\langle b_{empty} \rangle \leftarrow$ LE($\langle C[j] \rangle$, $\langle 0 \rangle$) |
| 7: | $\langle b_{found} \rangle \leftarrow$ ADD($\langle b_{found} \rangle$, $\langle b_{match} \rangle$) |
| 8: | $\langle i_{empty} \rangle \leftarrow$ CondSwap($\langle j \rangle$, $\langle i_{empty} \rangle$, $\langle b_{empty} \rangle$) |
| 9: | $\langle C[j] \rangle \leftarrow$ ADD($\langle C[j] \rangle$, $\langle b_{match} \rangle$) |
| 10: | end for |
| 11: | $\langle b_{not-empty} \rangle \leftarrow$ EQ($\langle i_{empty} \rangle$, $\langle -1 \rangle$) |
| 12: | $\langle b_{decrement} \rangle \leftarrow$ AND($b_{not-empty}$, NOT($b_{found}$)) |
| 13: | for j $\leftarrow$ 1 to t do //Conditional decrement |
| 14: | $\langle b_{empty}, j \rangle \leftarrow$ AND(NOT($\langle b_{match} \rangle$);EQ($\langle i_{empty} \rangle$, $\langle j \rangle$)) |
| 15: | $\langle c \rangle \leftarrow$ ADD($\langle C[j] \rangle$, $\langle b_{decrement} \rangle$) |
| 16: | $\langle C[j] \rangle \leftarrow$ CondSwap($\langle 1 \rangle$, $\langle c \rangle$, $\langle b_{empty}, j \rangle$) |
| 17: | $\langle V[j] \rangle \leftarrow$ CondSwap($\langle d \rangle$, $\langle V[j] \rangle$, $\langle b_{empty}, j \rangle$) |
| 18: | end for |
| 19: | end for |
| 20: | for j $\leftarrow$ 1 to t do //DP thresholding, using noises N |
| 21: | for party p $\in$ P do |
| 22: | $\langle C[j] \rangle \leftarrow$ ADD($\langle C[j] \rangle$, $\langle \rho_p j \rangle$) |
| 23: | end for |
| 24: | $\langle b_{discard} \rangle \leftarrow$ LE($\langle C[j] \rangle$, $\langle \tau_{HH1} \rangle$) |
| 25: | $\langle V[j] \rangle \leftarrow$ CondSwap($\langle \perp \rangle$, $\langle V[j] \rangle$, $\langle b_{discard} \rangle$) |
| 26: | end for |
| 26: | Sort values in $\langle V \rangle$ by corresponding counts $\langle C \rangle$ descendingly |
| 28: | return Rec($\langle V \rangle$) | parties secret share their inputs with the computation parties, and the computation parties execute the computation of HH1.

Figure 3:
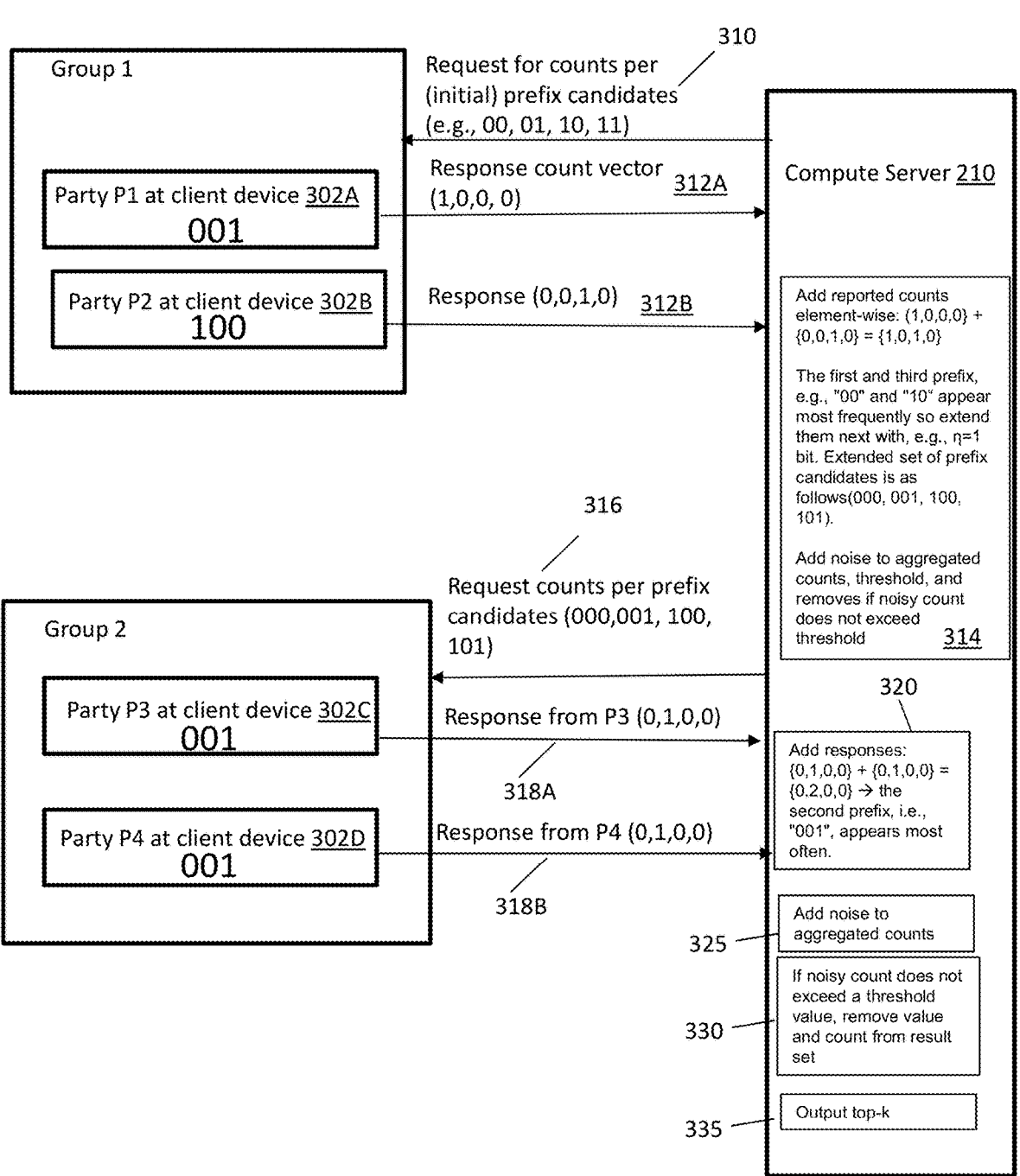
FIG. 3 depicts an example process for a second algorithm HH2 that determines the top-k or heavy hitter values, in accordance with some example embodiments.

In the case of MPC for the top-k, the parties 202A-E may provide to each other an input message including the value and a partial noise value, wherein the input message is encrypted via a secret share. For example, party 202A may provide an encrypted message containing "4" and a partial noise value to the other parties 202B-E. The partial noise is added to the count value as noted above with respect to FIG. 2F. Alternatively, or additionally, the MPC computation may, as noted, by outsourced to a compute node(s) (e.g., a cloud service as noted above), in which case the parties would send the input messages to the cloud nodes for the MPC computation. To improve the computer efficiency of FIG. 3 depicts an example of the function for the second protocol $\mathcal{F}_{HH2}$, in accordance with some example embodiments. Unlike the first protocol $F_{HH1}$, the parties 302A-D encode, such as binary encode, their values in the data set being evaluated for the top-k. For example, the first party may encode a value A as 01000001, and each encoded value includes a prefix, such as 01 in this example. The parties may be split into g groups, such that a first group is asked if their value starts with a prefix of a length, such as a predetermined length (e.g., $\gamma+\eta$ where $\gamma=[\log_2 k]$ and $\eta$ is the number of bits we extend the prefixes per round; see, also, Table 8 below). The most frequently appearing prefixes in the first group are then used to query the next group, such as the second group, in this example. The most frequently appearing prefixes in the first group may also be extended by η bits (e.g., a length γ+2η) for the query of the next group, and this process may be repeated until the prefix length is equal to the bit-length b of the domain (e.g., in the case of ASCII encoding, a domain length of 8 for a length of 8 per symbol).

In the example of FIG. 3, the set of parties includes party P1 302A, P2 302B, P3 302C, and P4 302D. The first party P1 includes binary encoded values 001, the second party P2 includes binary encoded values 100, the third party P3 includes binary encoded values 001, and the fourth party P4 holds binary encoded values 001. The parties P1-P4 are divided into groups, which in this example corresponds to two groups, so P1 and P2 are in group 1 and P3 and P4 are in group P4.

At 310, the compute server queries the first group and requests counts for an initial set of prefixes of length 2 (e.g., γ=1, η=1). For example, counts are requested for the initial set of prefixes (00, 01, 10, and 11). In response, the first party 302A responds, at 312A, with a count vector (1,0,0,0) representative of the prefix 00, which corresponds to the encoded data value it holds 001. And, the second party 302B responds, at 312B, with the count vector (0,0,1,0) representative of the prefix 10, which corresponds to the encoded data value it holds 100.

At 314, the compute server 210 adds the reported counts element-wise. For example, the count vectors (1,0,0,0) and (0,0,1,0) are added to yield (1,0,1,0), which indicates that the most frequently occurring prefixes are "00" and "10". In some implementations, the compute server 210 may add noise to the counts and perform thresholding as described below with respect to 325 and 330). If a noisy count does not exceed a threshold value at 330, the value corresponding count is removed as a top-k result (see, e.g., Table 8 at 2D). In the example of FIG. 3, the count for prefix 001 does exceed the threshold, so it is released as the top-1 value at 335.

Next, the compute server extends the 2 bit prefix of the most frequently occurring prefixes by a given value, such as η=1 bit.

At 316, the compute server 210 queries the second group of parties 302C-D requests counts for prefix candidates (000, 001, 100, and 101). These prefix candidates correspond to the extended prefixes for 00 (which corresponds to 3 bit prefixes 000 and 001) and the prefixes for 10 (which corresponds to 3 bit prefixes 100 and 101). In response, the third party 302C responds, at 318A, with a count vector (0,1,0,0) representative of the prefix 001, which corresponds to the encoded data value it holds 001. And, the fourth party 302D responds, at 318B, (0,1,0,0) representative of the prefix 001, which corresponds to the encoded data value it holds 001.

At 320, the compute server 210 adds the reported counts element-wise. For example, the count vectors (0,1,0,0) and (0,1,0,0) are added to yield (0,2,0,0), which indicates that the most frequently occurring prefixes is 001.

At 325, the compute server 210 adds noise, such as Laplacian distributed noise and the like, to the counts. For example, the compute server may add noise to the aggregate counts, such as the counts in the aggregate vector (0,2,0,0). If a noisy count does not exceed a threshold value at 330, the value corresponding count is removed as a top-k result (see, e.g., Table 8 at 2D). In the example of FIG. 3, the count for prefix 001 does exceed the threshold, so it is released as the top-1 value at 335. As noted above, the addition of noise and thresholding may also be performed at other times, such as during 314 and 320 above. Moreover, although process 300 depicts two iterations until the top-k are identified, there may be additional iterations to query additional groups and, as such, there may be additional rounds of adding noise, thresholding, and the like as noted above.

Like FIG. 3, Table 8 below also depicts an example implementation of the $\mathcal{F}_{HH2}$, in accordance with some example embodiments. In Table 8, a table T including entries is generated to map each prefix to a count. Table 8 also shows the formation of groups, which are disjoint in the sense that a party can only be a member of a single group.

In the case of an implementation where a trusted third party server is not used but instead MPC is used, the $\mathcal{F}_{HH2}$ algorithm described above with respect to FIG. 3 and Table 8 may be implemented as the HH2 MPC algorithm depicted at Table 9 below. In other words, the MPC HH2 algorithm is similar to $\mathcal{F}_{HH2}$ but HH2 uses MPC rather than a trusted server and the parties provide secure, such as encrypted inputs including the value and a partial noise value. To perform the joint computation of top-k using MPC, each of the parties 302A-D may provide a secured or encrypted messages (e.g., using secret shares). For example, the messages may include the response value(s) (e.g., 312A, 312B, and the like) and a partial noise value. The parties may perform the MPC among the parties by securely exchanging the messages with the other parties. The parties thus operate on the secure messages to yield a final secured (e.g., using secret shares) output which can be decrypted by each of the parties to reconstruct or reveal the result, such as the top-k values. As noted, the parties may, however, outsource this MPC processing to so-called computation parties.

In the case of MPC, each party may respond with an answer plus a partial noise value. In the case of the first party at 312A for example, it responds with (1+partialnoise1, 0+partialnoise2, 0+partialnoise3, 0+partialnoise4). At 314, the addition of the vectors across the first and second party of the first group yields (1+fullnoise1, 0+fullnoise2, 1+fullnoise3, 0+full noise4), for example. And, these responses (as well as other exchanges of information and the result output of 335) may be encrypted with a corresponding party's secret share.

TABLE 8

| | |
|---|---|
| 1. | Define map T to associate a prefix with a count, initialize set |

$$S = \{0, 1\}^{\lceil \log k \rceil}, \text{ and split data } D \text{ in } g = \left\lceil \frac{b - \lceil \log k \rceil}{\eta} \right\rceil \text{ disjoint}$$

groups $D_1, \ldots, D_g$.

Here, b is the bit-length of the domain and η is the number of bits by which the prefixes are extended for each round. Also, k is the number of requested output elements (i.e., top-k).

| | |
|---|---|
| 2. | For each group $j \in \{1,...,g\}$: |
| (a) | Candidate prefix set $C = S \times \{0, 1\}^\eta$ |
| (b) | For each prefix $c \in C$: | i. Set $T[c] = \sum_{d \in D_j} \zeta_d^c$, where $\zeta_d^c \in \{0, 1\}$ is a user report indicating if her value $d$ matches prefix candidate $c$.

| | |
|---|---|
| (c) | Set $S = \{ \}$ and $z = \min_{c \in C} T[c] + \text{Laplace}(1/\varepsilon)$. |
| (d) | For the top-k prefixes $c_k \in C$: |
| i. | Add noise $\text{Laplace}(1/\varepsilon)$ to count $T[c_k]$. |
| ii. | Add $c_k$ to S if |

$$T[c_k] \geq \tau_{HH2} + z,$$

where $\tau_{HH2} = 1 + \log(\Delta/\delta)/\varepsilon$.

| | |
|---|---|
| (e) | Output items in S sorted by their noisy count. |

Although a variety of noise mechanisms may be used, in the case of unrestricted sensitivity Δ, the Gumbel mechanism for noise may be used instead of Laplace noise at 2(d)(i) at Table 8.

In the case of an implementation where a trusted third party server is not used, the HH2 MPC algorithm described above may be implemented as depicted and described at Table 9 below. At Table 9, the MPC operations (or subprotocols) are listed in Table 6, which may be implemented as noted above. The sorting in line 9 can be implemented as a sorting network (based on conditional swaps) where the sorting result (a bit indicating that a value is smaller or larger) for C is re-used to sort i in the same way. The inputs and computation values are scaled integers (also known as fix point representation), which allow for more efficient secure implementation than floating point numbers.

TABLE 9

Input: Noisy user reports $\zeta_{d}/^{c}$ indicating if $d \in D$ has prefix c (including distributed noise), output size k, domain bit-length b, prefix extension bit-length $\eta$, DP threshold $\tau_{HH2}$, and distributed noises $\rho_p$ per party $p \in \mathcal{P}$ (for threshold).
Output: DP top-k.

Figure 4:
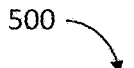
FIG. 4 depicts a block diagram illustrating a computing system consistent with implementations of the current subject matter.
Figure 4:
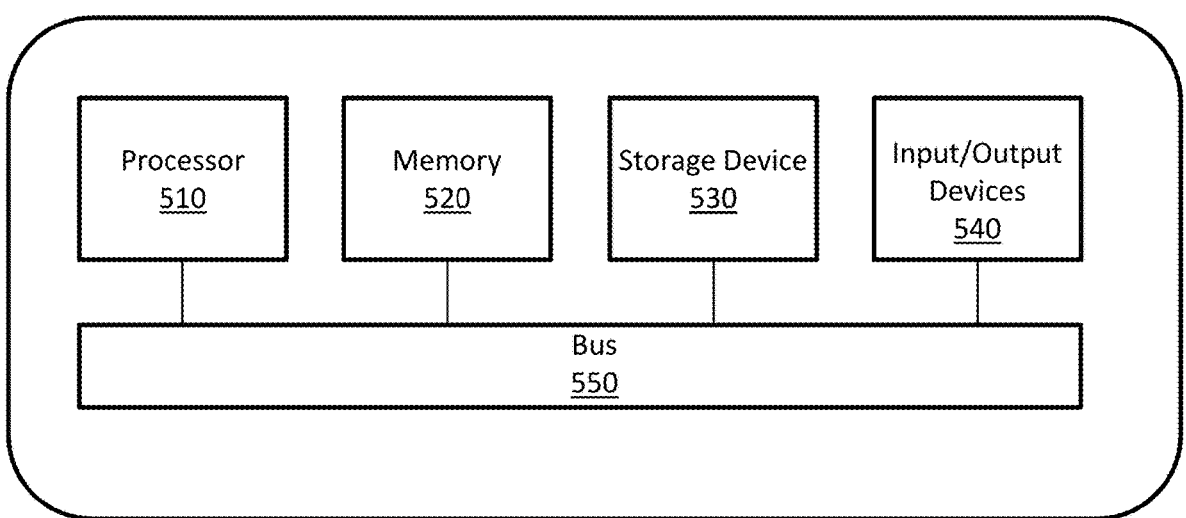

1: Split users in $g = \left\lceil \dfrac{b - \lceil \log k \rceil}{\eta} \right\rceil$ disjoint groups where $D = \bigcup_{i=1}^{g} D_i$ 2: for group $i \leftarrow 1$ to g do
3:   Initialize arrays $\langle S \rangle$, $\langle C \rangle$ of sizes k, $2^{\lceil \log k \rceil + \eta}$ with zeros
4:   Initialize array $\langle I \rangle \leftarrow \{\langle 1 \rangle, \ldots, \langle 2^{\lceil \log k \rceil + \eta} \rangle\}$
5:   Initialize $\langle \rho_\tau \rangle \leftarrow \langle 0 \rangle$ and $\langle \tau \rangle \leftarrow \langle 0 \rangle$
6:   for candidate $c \leftarrow 1$ to $2^{\lceil \log k \rceil + \eta}$ do
7:     for user datum $d \in D_i$ do   //Gather prefix counts
8:       $\langle C[c] \rangle \leftarrow \text{ADD}(\langle C[c] \rangle, \langle \zeta_{d}/^{c} \rangle)$
9:     end for
10:   end for
11:   Sort candidate indices $\langle I \rangle$ by their corresponding counts $\langle C \rangle$ descendingly
12:   for party $p \in \mathcal{P}$ do
13:     $\langle \rho_\tau \rangle \leftarrow \text{ADD}(\langle \rho_\tau \rangle, \langle \rho_p \rangle)$
14:   end for
15:   $\langle \tau \rangle \leftarrow \text{ADD}(\text{ADD}(\langle \tau_{HH2} \rangle, \langle \rho_\tau \rangle), \langle C[2^{\lceil \log k \rceil + \eta}] \rangle)$
16:   for candidate $c \leftarrow 1$ to k do   //DP thresholding on noisy C
17:     $\langle b_{discard} \rangle \leftarrow \text{LE}(\langle C[c] \rangle, \langle \tau \rangle)$
18:     $\langle S[c] \rangle \leftarrow \text{CondSwap}(\langle \perp \rangle, \langle I[c] \rangle, \langle b_{discard} \rangle)$
19:   end for
20:   return $\text{Rec}(\langle S \rangle)$
21: end for FIG. 4 depicts a block diagram illustrating a computing system 400 consistent with implementations of the current subject matter. For example, the system 400 can be used to implement the client devices, the server, and/or the like.

As shown in FIG. 4, the computing system 500 can include a processor 510, a memory 520, a storage device 530, and input/output devices 540. According to implementations of the current subject matter, a trusted execution environment may be a secure area that may be contained in the processor 510, or it may be an additional hardware and/or software component. The trusted execution environment may run enclaves to guarantee confidentiality and integrity protection to code and data contained therein, even in an untrusted environment.

The processor 510, the memory 520, the storage device 530, and the input/output devices 540 can be interconnected via a system bus 550. The processor 510 is capable of processing instructions for execution within the computing system 500. Such executed instructions can implement one or more components of, for example, the trusted server, client devices (parties), and/or the like. In some implementations of the current subject matter, the processor 510 can be a single-threaded processor. Alternately, the processor 510 can be a multi-threaded processor. The process may be a multi-core processor have a plurality or processors or a single core processor. The processor 510 is capable of processing instructions stored in the memory 520 and/or on the storage device 530 to display graphical information for a user interface provided via the input/output device 540.

The memory 520 is a computer readable medium such as volatile or non-volatile that stores information within the computing system 500. The memory 520 can store data structures representing configuration object databases, for example. The storage device 530 is capable of providing persistent storage for the computing system 500. The storage device 530 can be a floppy disk device, a hard disk device, an optical disk device, or a tape device, or other suitable persistent storage means. The input/output device 540 provides input/output operations for the computing system 500. In some implementations of the current subject matter, the input/output device 540 includes a keyboard and/or pointing device. In various implementations, the input/output device 540 includes a display unit for displaying graphical user interfaces.

According to some implementations of the current subject matter, the input/output device 540 can provide input/output operations for a network device. For example, the input/output device 540 can include Ethernet ports or other networking ports to communicate with one or more wired and/or wireless networks (e.g., a local area network (LAN), a wide area network (WAN), the Internet).

In some implementations of the current subject matter, the computing system 500 can be used to execute various interactive computer software applications that can be used for organization, analysis and/or storage of data in various (e.g., tabular) format (e.g., Microsoft Excel®, and/or any other type of software). Alternatively, the computing system 500 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities (e.g., SAP Integrated Business Planning add-in for Microsoft Excel as part of the SAP Business Suite, as provided by SAP SE, Walldorf, Germany) or can be standalone computing products and/or functionalities. Upon activation within the applications, the functionalities can be used to generate the user interface provided via the input/output device 540. The user interface can be generated and presented to a user by the computing system 500 (e.g., on a computer screen monitor, etc.).

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. For example, the logic flows may include different and/or additional operations than shown without departing from the scope of the present disclosure. One or more operations of the logic flows may be repeated and/or omitted without departing from the scope of the present disclosure. Other implementations may be within the scope of the following claims.

What is claimed is:

1. A system, comprising:

at least one data processor; and at least one memory storing instructions which, when executed by the at least one data processor, result in operations comprising:

generating, for a top-k value determination across a plurality of clients, a table including entries to map candidate values to corresponding counts;

receiving, from each of the plurality of clients, a candidate value;

in response to a received candidate value matching one of the entries in the table, incrementing, for the matching candidate value, a corresponding count;

in response to the received candidate value not matching one of the entries in the table and the table not exceeding a threshold size, adding an entry to the table by adding the received candidate value with a count value of 1;

in response to the received candidate value not matching one of the entries in the table and the table exceeding the threshold size, decrementing all of the counts in the table by 1 and deleting from the table any entries having a count of zero;

adding one of Laplace noise, exponential noise, or Gumbel noise to the corresponding counts in the entries of the table;

in response to a noisy corresponding count being less than a threshold value, deleting the corresponding entry in the table for the noisy corresponding count;

determining, based on a multi-party computation using a domain of data across the plurality of clients and over the domain of data, a top-k value result set, wherein the multi-party computation comprises a plurality of compute nodes across one or more of the plurality of clients and the top-k value result set being split into multiple shares distributed across the compute nodes, each of the compute nodes exchanging secure input messages with other compute nodes, each of the secure input messages containing one or more of the shares, and the exchanged secure input messages being used to jointly compute the top-k value result set by combining the shares contained in the secure input messages to reconstruct the top-k value result set, while keeping private data secret from the other compute nodes; and outputting at least a portion of the table as the top-k value result set.

2. The system of claim 1, wherein the table is sorted based on the noisy corresponding count before the outputting.

3. The system of claim 1, wherein the system comprises or is comprised in a trusted server.

4. The system of claim 1, wherein the receiving, from each of the plurality of clients, the candidate value comprises, receiving the candidate value in a secured message, the secured message further including a partial noise value.

5. The system of claim 4, wherein the adding noise to the corresponding counts in the entries of the table further comprises adding the noise based on the partial noise value from each of the plurality of clients.

6. The system of claim 1, wherein the outputting at least a portion of the table as the top-k value result set further comprises outputting the at least a portion of the table in a secured message.

7. The system of claim 1, wherein the top-k value result set is output in accordance with differential privacy.

8. A computer-implemented method comprising:

generating, for a top-k value determination across a plurality of clients, a table including entries to map candidate values to corresponding counts;

receiving, from each of the plurality of clients, a candidate value;

in response to a received candidate value matching one of the entries in the table, incrementing, for the matching candidate value, a corresponding count;

in response to the received candidate value not matching one of the entries in the table and the table not exceeding a threshold size, adding an entry to the table by adding the received candidate value with a count value of 1;

in response to the received candidate value not matching one of the entries in the table and the table exceeding the threshold size, decrementing all of the counts in the table by 1 and deleting from the table any entries having a count of zero;

adding one of Laplace noise, exponential noise, or Gumbel noise to the corresponding counts in the entries of the table;

in response to a noisy corresponding count being less than a threshold value, deleting the corresponding entry in the table for the noisy corresponding count;

determining, based on a multi-party computation using a domain of data across the plurality of clients and over the domain of data, a top-k value result set, wherein the multi-party computation comprises a plurality of compute nodes across one or more of the plurality of clients and the top-k value result set being split into multiple shares distributed across the compute nodes, each of the compute nodes exchanging secure input messages with other compute nodes, each of the secure input messages containing one or more of the shares, and the exchanged secure input messages being used to jointly compute the top-k value result set by combining the shares contained in the secure input messages to reconstruct the top-k value result set, while keeping private data secret from the other compute nodes; and outputting at least a portion of the table as the top-k value result set on an output device.

9. The method of claim 8, wherein the table is sorted based on the noisy corresponding count before the outputting.

10. The method of claim 8, wherein the method is implemented by a trusted server, wherein the trusted server comprises at least one data processor and at least one memory.

11. The method of claim 10, wherein the trusted server performs the multi-party computation.

12. The method of claim 8, wherein the receiving, from each of the plurality of clients, the candidate value comprises, receiving the candidate value in a secured message, the secured message further including a partial noise value.

13. The method of claim 12, wherein the adding noise to the corresponding counts in the entries of the table further comprises adding the noise based on the partial noise value from each of the plurality of clients.

14. The method of claim 8, wherein the outputting at least a portion of the table as the top-k value result set further comprises outputting the at least a portion of the table in a secured message.

15. The method of claim 8, wherein the top-k value result set is output in accordance with differential privacy.

\* \* \* \* \*